April 16, 1946.  R. W. HAYWARD  2,398,585
MANURE FORK
Filed July 6, 1944  3 Sheets-Sheet 1

Inventor
RAYMOND W. HAYWARD,
By Clarence A. O'Brien
and Harvey B. Jacobson
Attorneys

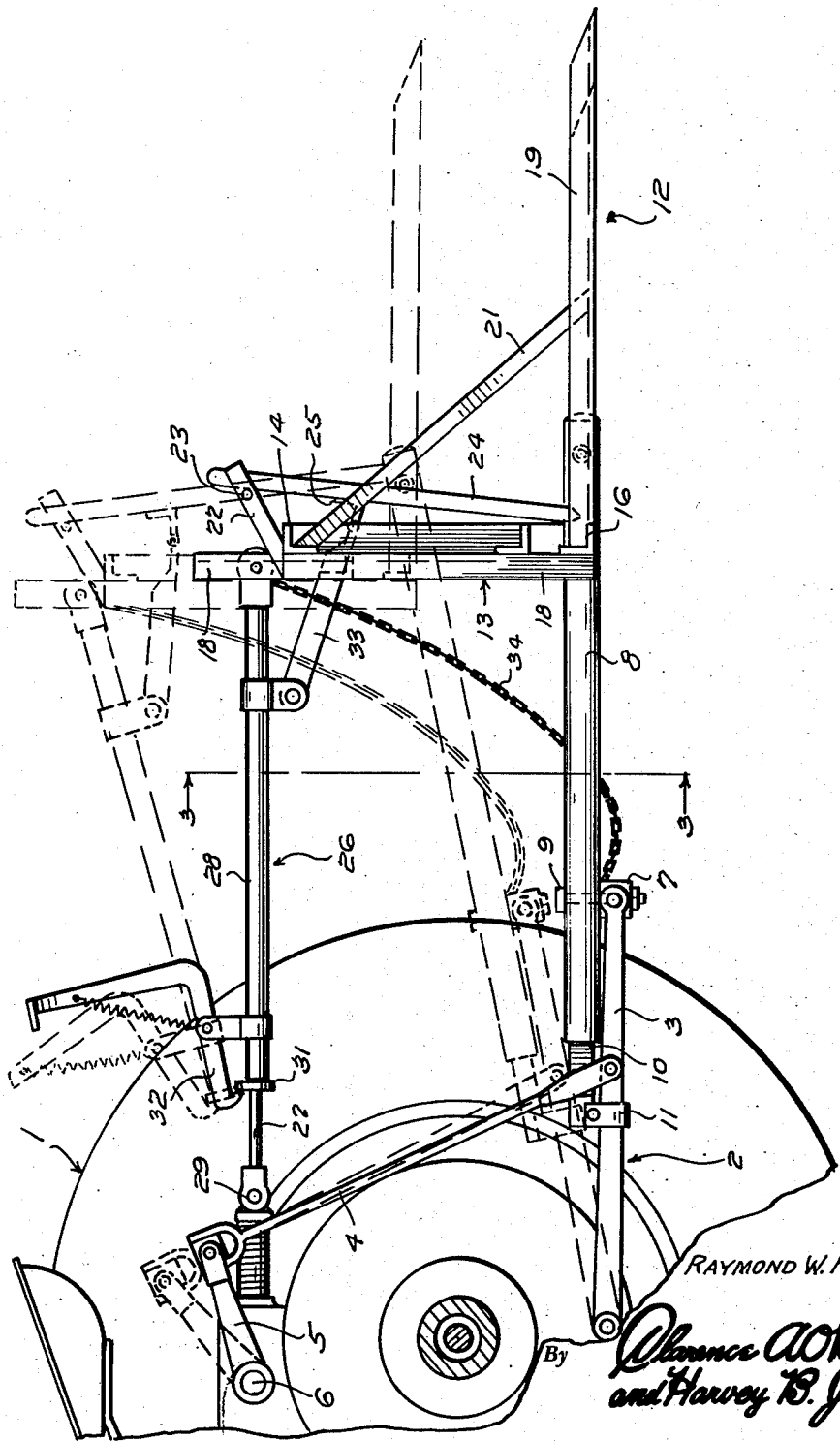

April 16, 1946.          R. W. HAYWARD          2,398,585
                              MANURE FORK
          Filed July 6, 1944              3 Sheets-Sheet 3
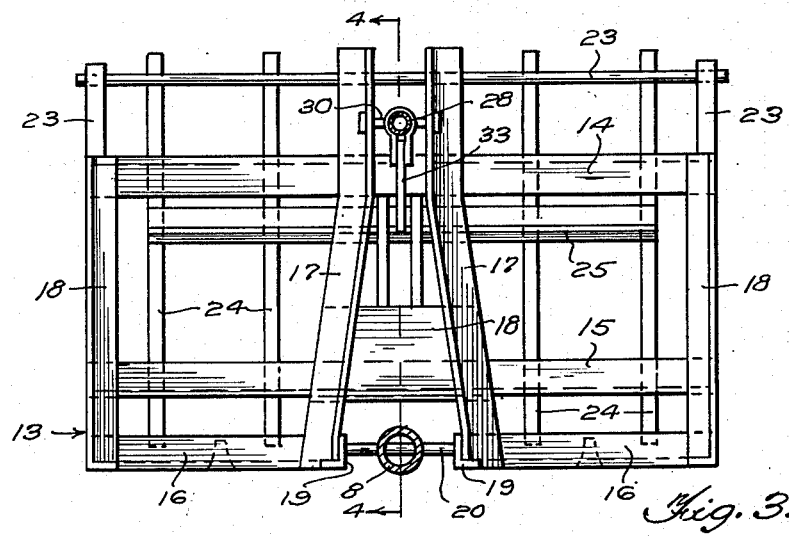
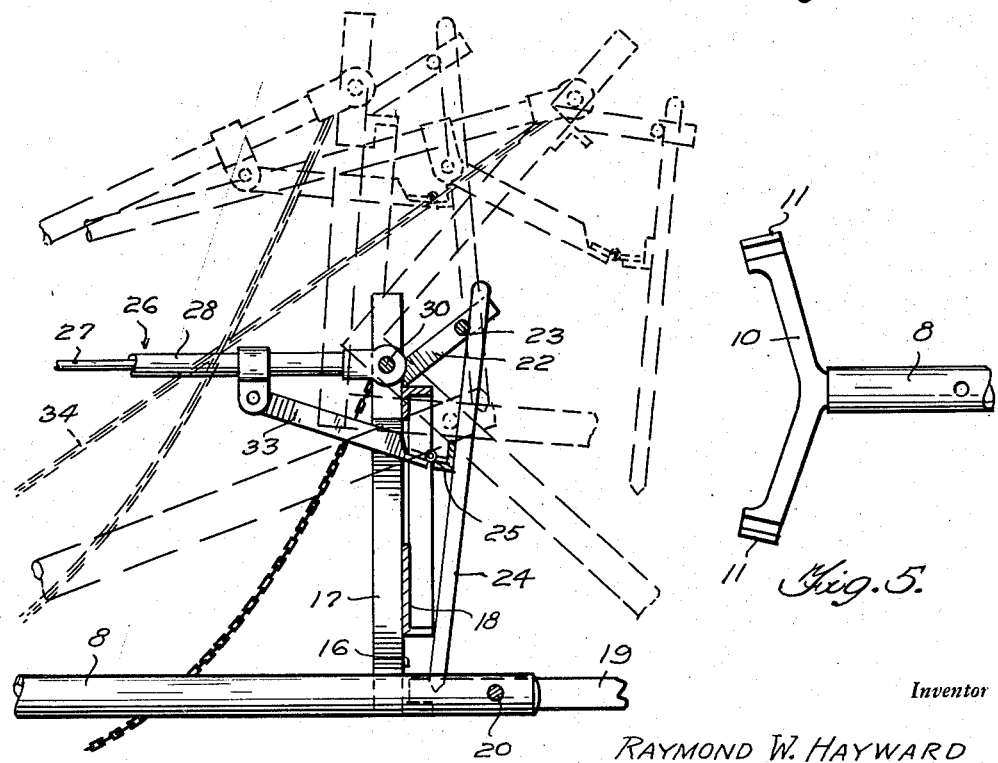
Inventor
RAYMOND W. HAYWARD
By Clarence A. O'Brien
and Harvey B. Jacobson
                              Attorneys Patented Apr. 16, 1946

2,398,585

UNITED STATES PATENT OFFICE 2,398,585

MANURE FORK

Raymond W. Hayward, Stephenson, Mich.

Application July 6, 1944, Serial No. 543,668

3 Claims. (Cl. 214—140)

The present invention relates to new and useful improvements in manure forks, and has for its primary object to provide, in the manner as hereinafter set forth, a device of this character which is adapted to be expeditiously mounted for operation on the Ferguson linkage system of a Ford tractor.

Another very important object of the invention is to provide a device of the aforementioned character comprising a unique construction and arrangement whereby the fork will be automatically maintained in a substantially horizontal plane at all times during its elevation.

Another highly important object of the invention is to provide a manure fork of the aforementioned character which may readily be adjusted manually to a horizontal position even though the tractor on which the apparatus is mounted be on an incline.

Still another very important object of the invention is to provide a fork of the character described which embodies novel dumping and clearing means.

Other objects of the invention are to provide a manure fork of the character set forth which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:

Figure 2 is a view in side elevation thereof.

Figure 3 is a view in transverse section, taken substantially on the line 3—3 of Figure 2.

Figure 4 is a fragmentary view in longitudinal section, taken substantially on the line 4—4 of Figure 3.

Figure 5 is a plan view of the means for securing the forward end of the arm to the tension links of the hydraulic lift of the tractor.

Figure 1:
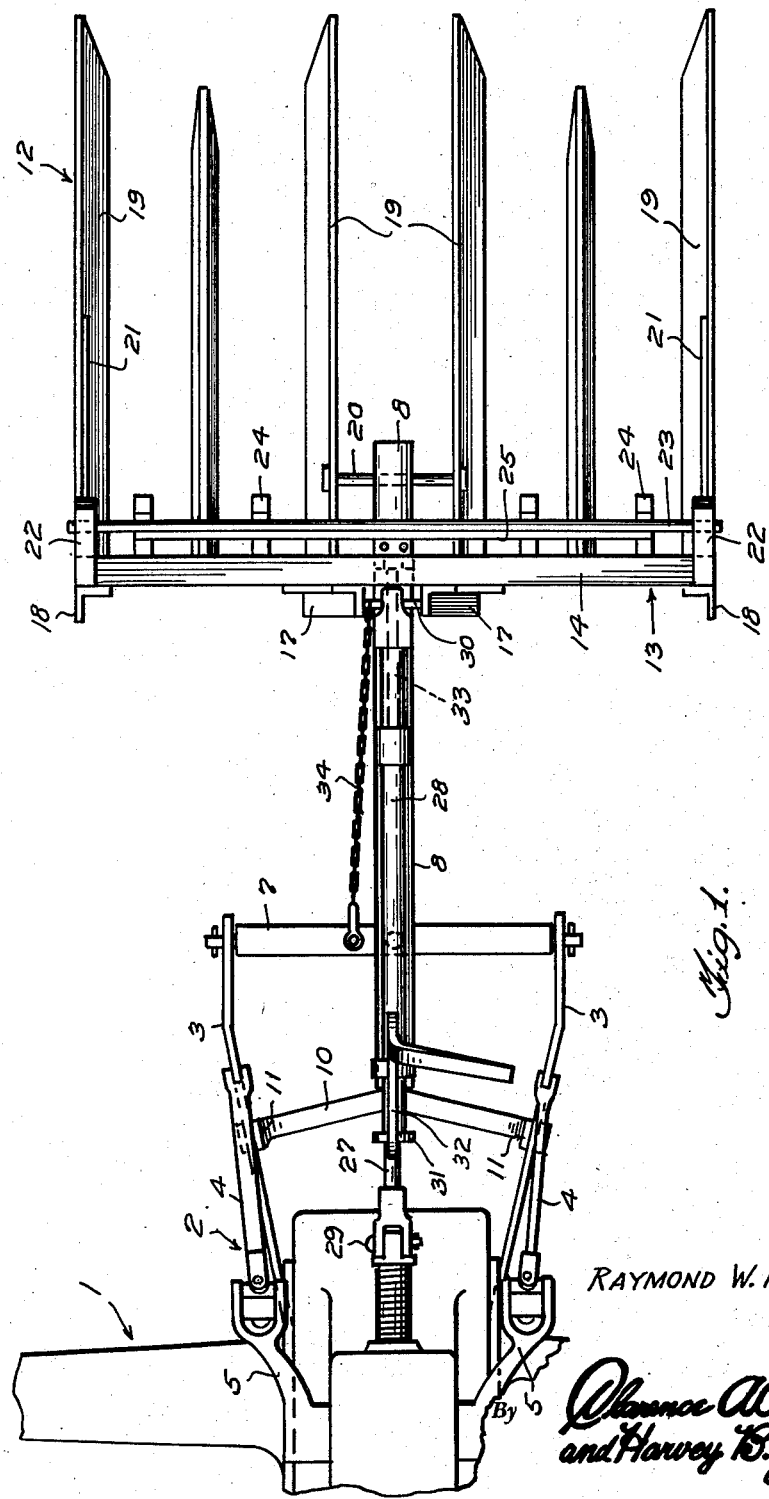
Figure 1 is a top plan view of a manure fork constructed in accordance with the present invention, showing the device mounted on a tractor.

Referring now to the drawings in detail, it will be seen that reference character 1 designates generally the rear end portion of a tractor equipped with a linkage system 2. The system 2 includes a pair of tension links 3 which are connected by lift rods 4 to a pair of arms 5 on a shaft 6. Mounted between the free end portions of the tension links 3 is a draw bar 7.

A tubular metallic arm 8 is secured by a bolt 9 on the draw bar 7. The tubular arm 8 projects forwardly beyond the draw bar 7 and has fixed on its front end a crosshead 10. Clamps 11 secure the crosshead 10 to the tension links 3.

Mounted for swinging movement on the rear end portion of the tubular arm 8 is a fork or head 12. As best seen in Figure 3 of the drawings the head 12 comprises a vertical frame 13. The frame 13 comprises a horizontal upper member 14, a horizontal intermediate member 15 and a pair of lower horizontal members 16. Inner and outer uprights 17 and 18, respectively are mounted on the members 14, 15, and 16. The uprights 17 project above the member 14 and comprise diverging lower portions. A metallic web or plate 18 is fixed on the lower portions of the members 17 for strengthening the structure. Tines 19 project from the members 16. Extending between the two innermost tines 19 is a shaft 20 which is journaled in the tubular arm 8 for mounting the head 12 for vertical swinging movement thereon. Braces 21 are provided for the outer tines 19.

Brackets 22 extend upwardly and rearwardly from the end portions of the frame structure 13. Journaled in the brackets 22 is a shaft 23. Kickers 24 are fixed on the shaft 23 and depend therefrom adjacent the frame structure 13. The kickers 24 are connected for operation in unison by a bar 25.

The usual compression link of the system 2 is removed and a telescopic rod 26 is substituted therefor. The rod 26 includes male and female sections 27 and 28, respectively, the former being pivotally connected at 29 to the system 2. The section 28 is pivotally secured at 30 between the upper portions of the members 17 of the frame 13.

Fixed on the forward portion of the member 27 of the rod 26 is a collar 31. A spring loaded latch 32 is pivotally mounted on the member 28 and engageable with the collar 31 for releasably securing the rod 26 in retracted or unextended position. A link 33 has one end pivotally connected to the rod 26 and its other end pivotally connected to the bar 25. A chain 34 from the draw bar 7 is connected to the upper portion of the frame 13 for limiting downward swinging movement of the head 12.

It is thought that the operation of the device will be readily apparent from a consideration of the foregoing. Briefly, the links 3 of the system 2 are swung downwardly to lower the head 12 to a point closely adjacent the ground to permit loading. When the head 12 has thus been loaded by backing the tractor 1 toward the material, the links 3 are swung upwardly to elevate the load. During these movements of the head 12 the rod 26 functions as a parallel device for mainatining said head in a substantially horizontal plane. The load may be transported at any desired elevation. When the point at which the load is to be dumped is reached, the latch 32 is disengaged from the collar 31 for permitting the head 12 to swing downwardly by gravity. The telescopically extensible rod 26 permits this. When the head 12 swings downwardly, the rod section 28 slides rearwardly on the section 27 and the link 33 swings the kickers 24 rearwardly in a manner to assist in removing the load. The apparatus may then be swung downwardly into engagement with the ground for causing the head 12 to swing upwardly thereby moving the member 28 forwardly on the member 27 for engaging the latch 32 with the collar 31. Or, this may be accomplished by connecting a rope or cable to the head 12.

It is believed that the many advantages of a manure fork constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A fork of the character described comprising an arm, means for mounting said arm for vertical swinging movement on a tractor, a head pivotally mounted for vertical swinging movement on said arm, a parallel device connected to the tractor and to the head for releasably securing said head in a substantially horizontal plane, a plurality of kickers mounted on the head, and means operatively connecting the parallel device to the kickers for actuating said kickers for assisting in unloading the head when said head is swung downwardly.

2. A fork of the character described comprising an arm, means for mounting said arm on a tractor for vertical swinging movement, a head pivotally mounted for vertical swinging movement on the arm, a rod connected to the tractor and to the head for maintaining said head in a substantially horizontal plane, said rod including male and female telescopic sections, means for releasably securing the rod in retracted position, and means operable by the rod for removing the load from the head when said head is swung downwardly on the arm.

3. A parallel device for a fork head pivoted on an arm vertically swingable by the hydraulic lift of a tractor, said device comprising an extensible rod including telescopically connected male and female rod sections one adapted to be pivoted at one end to said head and the other adapted to be pivoted at one end to said tractor, a collar fixed on the male rod section, a latch pivotally mounted on the female rod section and engaged with said collar for releasably securing said rod against extension, a swingable kicker device adapted to be mounted on said head for operation to unload the same, and means to operate said kicker device by extension of said rod.

RAYMOND W. HAYWARD.